United States Patent [19]

Wagner et al.

[11] 3,958,041

[45] May 18, 1976

[54] ROAD MARKING MATERIAL

[75] Inventors: Reinhard Wagner, Mainz; Hinrich Hinrichs, Mainz-Gonsenheim; Paul Oberressl, Wiesbaden, all of Germany

[73] Assignee: Hoechst Aktiengesellschaft, Frankfurt, Germany

[22] Filed: Nov. 19, 1973

[21] Appl. No.: 416,814

[30] Foreign Application Priority Data

Nov. 23, 1972 Germany............................ 2257431

[52] U.S. Cl............................ 427/137; 260/27 R; 260/27 BB; 260/31.6; 260/31.8 HR; 260/32.4; 260/32.6 NR; 260/33.8 UA; 260/42; 260/42.18; 260/42.21; 260/42.43; 260/42.46; 260/42.47; 260/62; 260/998.19
[51] Int. Cl.²................... C08K 3/00; C08K 3/34
[58] Field of Search............. 260/62, 998.19, 27 R, 260/27 BB, 31.6, 32.4, 32.6, 33.8 UA, 42, 42.18, 42.21, 42.43, 42.46, 42.47; 427/137

[56] References Cited
UNITED STATES PATENTS

| | | | |
|---|---|---|---|
| 2,224,837 | 12/1940 | Rosenthal et al. | 260/62 |
| 2,500,755 | 3/1950 | Jones | 260/62 |
| 2,879,171 | 3/1959 | Kullenberg | 106/193 J |
| 3,070,557 | 12/1962 | Gessler et al. | 260/41 |
| 3,364,168 | 1/1968 | Gessler et al. | 260/33.6 |
| 3,420,915 | 1/1969 | Braithwaite | 260/62 |

OTHER PUBLICATIONS

Boundy et al., Styrene Its Polymers, Copolymers & Derivatives, 1952, Reinhold Pub. Corp., New York, pp. 825, 832–833, 839–842.

*Primary Examiner*—James H. Derrington
*Attorney, Agent, or Firm*—Berman, Aisenberg & Platt

[57] ABSTRACT

A resinous road marking composition comprising in addition to pigments and fillers a hydrocarbon resin having an average molecular weight of up to 10,000 and containing 4 to 50 per cent by weight of chemically built-in phenolic components which composition may contain an additional hydrocarbon resin being free from phenolic components. A process for preparing said composition which is pourable as a hot melt wherein the resinous binder is maintained molten at a temperature in the range from 100° to 200°C and a mixture of the fillers and pigments is added thereto and mixed in homogeneously.

23 Claims, No Drawings

ROAD MARKING MATERIAL

The invention is concerned with improvements in or relating to road marking material.

It is known to prepare material for road marking wherein the so-called hot melt pouring materials are distinguished from cold pouring materials. The hot melt pouring material is applied onto the substrate, e.g. roads, from the melt whereas the cold pouring material is used in the form of solutions of polymers, e.g. in polymerizable monomers. The third form is represented by the road marking paints, which in the form of thin solutions are applied onto the substrate to be marked, e.g. at coat thicknesses below 500 $\mu$.

It is known to use for these purposes different resins — possibly with addition of plasticizers — in the form of binders combined with fillers and pigments. Hydrocarbons, such as petroleum resins, polystyrene and terpene resins, furthermore epoxy and acrylic resins have already been suggested among others for this purpose. These binding agents however have the disadvantage that the ratio of the binders to the total amount of fillers and pigments is limited to maximum values of 1:4. Moreover, the known pouring materials have the disadvantage to require in every case additional plasticizers.

The use of hydrocarbon resins, prepared from hydrocarbon fractions having a boiling point of 130° to 155°C, for hot melt pouring material and road marking paints has already been described. In these compositions, however, the amount of fillers and pigments is at most triple the resin quantity. Furthermore it is known to produce alcohol soluble coumarone resins and hydrocarbon resins by cationic polymerization of aromatic olefins in the presence of phenols, but not to use such polymerization products for road marking.

The present invention avoids the preceding disadvantages. In particular the invention relates to a resinous road marking material comprising in addition to pigments and fillers, and if desired other usual additives, a hydrocarbon resin having an average molecular weight of up to 10,000, preferably up to 5,000 and containing 4 to 50, preferably 5 to 15 per cent by weight of built-in phenolic components. The minimum value of the average molecular weight is 300, preferably 1,500.

The binders used according to the invention surprisingly enable the composition to take up an essentially higher amount of fillers and pigments than usual. Thus the ratio of binders to the total amount of fillers and pigments can, for example, be in the range from 1:3 to 1:10, in some cases even still higher, preferably ranging from 1:5 to 1:7.

Generally the binders used according to the invention are prepared from the hydrocarbon resins in one step, by reacting the unsaturated monomers to be polymerized together with the phenolic compounds, especially phenol, and in the presence of a catalyst which accelerates the polymerization as well as the reaction with the phenol. The catalyst can then be precipitated — e.g. with calcium hydroxide, soda or amines — or eliminated by washing out, e.g. with water.

Generally the reaction is performed in solution. Suitable solvents are aliphatic and/or aromatic hydrocarbons with a boiling point in the range from 50° to 200°C, for example, paraffins having a boiling point in the range from 80° to 160°C, benzene, toluene, xylene, furthermore the telogens mentioned below, i.e. chain-stopping agents, as well as olefinically unsaturated hydrocarbons difficult to polymerize or mixtures thereof. The reaction can be performed under normal pressure or under elevated pressure, batchwise or continuously. The reaction temperature generally ranges from minus 20° to plus 140°C, preferably from 0° to 80°C. Either the hydrocarbon resin and the phenolic component may be placed in a reaction vessel and subsequently the catalyst added or vice versa. On the other hand, the catalyst may be placed in a reaction vessel and the monomer added or in the reverse order.

Suitable phenols for the phenolic components are mono- or polynuclear, substituted or unsubstituted, mono- or polyhydric phenols, such as phenol, the cresols, xylenols, naphthols, alkyl phenols, such as p-tert.-butyl phenol, furthermore phenols substituted with halogen, such as chlorine or bromine, amino, allyl or aryl groups, e.g. in the form of phenyl or benzyl. It is possible that the phenolic components in the binding agents are esterified or etherified. Suitable esterifying components are, for example, saturated and/or unsaturated fatty acids, such as dehydrated castor oil fatty acid, hydroxy carboxylic acids, such as hydroxy stearic acid, aromatic carboxylic acids, such as benzoic acid, cyclic aliphatic acids, such as hexachloro-endomethylene-tetrahydrophthalic acid; and stright-chained or branched or cyclic alcohols having 1 to 10 carbon atoms, e.g. methanol, ethanol, propanols, butanols, octanols, decanols, cyclohexanols as etherifying components.

Suitable catalysts for the modification of hydrocarbon resins with phenolic components are, for example, mineral and Lewis acids, such as sulphuric acid, hydrochloric acid, trichloroacetic acid, borontrifluoride, aluminium chloride, zinc chloride, titanium tetrachloride, stannic tetrachloride as well as their complexes or mixtures of such catalysts.

The structure of the hydrocarbon resin can be based on wholly different olefinically unsaturated monomers, generally based on monomers with a boiling range from 130° to 200°C, as a rule preferably aromatic monomers, optionally in admixture with aliphatic or alicyclic monomers having a boiling range from minus 20° to plus 60°C. Suitable aliphatic or alicyclic monomers are, e.g. butadiene, isoprene, piperylene, isoamylene, n-pentene, isopentene, cyclopentene, cyclopentadiene, dimethylbutadiene; suitable monomers having a boiling point between 130° and 200°C, are e.g. styrene, allylbenzene, $\alpha$-methylstyrene, dicyclopentadiene, dihydrodicyclopentadiene, the various vinyltoluenes, $\beta$-methylstyrene, indene, methylindene, alkylindene. Furthermore the hydrocarbon resins can still contain e.g. the following monomers in the form of chain-stopping agents: at least mono- alkylated benzenes, indenes and/or naphthalenes, such as xylene, ethylbenzene, propylbenzene, methylethyl benzene, trimethyl or tetramethyl benzene.

Hydrocarbon resins comprising an essential amount of styrene, including such of modified polystyrene, are preferred. Such styrene copolymers are especially suitable for hydrocarbon resins having phenolic components.

It is possible and advantageous to combine binders according to the invention with an amount of phenol ranging from 10 or 15 to 50, preferably 30 to 50 per cent by weight with up to a fivefold quantity of phenol-free hydrocarbon resins. These two resin types may contain built-in amounts of maleic acid and its derivatives respectively. Suitable derivatives are e.g. anhydrides or esters of one or several monohydric aliphatic alcohols with 1 to 12 carbon atoms. Such mixtures of different hydrocarbon resins are also characterized by high pigment uptake.

Also the combination of several phenol containing hydrocarbon resins having various amounts of built-in phenolic components may be of advantage.

The consistency of the binder depends, among others, on the respective amount of phenolic components. The phenol-modified hydrocarbon resin, as binder, has the advantage that exudation of the plasticizer from the pouring material is impossible. Resins containing a higher amount of phenol are rather soft. A lower amount of phenol, however, e.g. of 4 to 15 per cent by weight, makes it sometimes advantageous to add to second resin, e.g. esterified colophony and/or lower molecular saturated polyesters, as additional binders, to the phenol modified hydrocarbon resin, whereby the second resin acts as a plasticizer. It is also possible to add a separate plasticizer.

According to another embodiment of the invention the phenol modified hydrocarbon resin having a relatively high amount of phenol may also be processed together with a non-modified hydrocarbon resin. In this case the softer phenol containing resin produces the plasticizing effect. Combinations of such hydrocarbon resins having a phenol content of 15 to 50% with non-modified hydrocarbon resins show, for example, an optimum pigment wetting.

When plasticizers are present in the binder, the weight ratio of plasticizer to binder may be 1:2 to 1:10, preferably 1:5 to 1:7. Suitable plasticizers are, for example, saturated polyester resins, e.g. those based on saturated aliphatic and/or aromatic dicarboxylic acids, such as adipic, sebacic, phthalic, terophthalic, isophthalic acids and polyhydric alcohols, such as glycols, glycerol, trimethylol propane or the like, monomer phthalic acid alkyl esters, e.g. dibutyl phthalate, polyurethane resins, chloroparaffins, oxethylated colophony, the latter especially for phenol containing polystyrene.

For the preparation of the hot melt pouring material the binder is liquefied, e.g. by heating up to about 100° to 200°C, preferably to 160° to 180°C. The fillers and pigments are then homogeneously mixed with the heater binder, suitably in the form of a mixture.

Suitable fillers are, for example, sand or silicates, such as alkaline, alkaline earth, and aluminium silicates; carbonates, such as lime, dolomite, i.e. all fillers in an amount of up to 80%, talc (up to 10%), inorganic fibres, such as asbestos, glass fibres, glass beads (up to 40%) or the like. Suitable pigments are titanium dioxide, barium sulphate, chromates, such as barium chromate (all up to 30%), cadmium sulphide, iron oxide, organic dyestuffs. The coloured pigments are most advantageous, especially if coloured road marking is required. The percentages are calculated on the total quantity of the material.

The binders obtained are light resins, e.g. with a color index below 5. For this reason they may easily be process with white or light coloured pigments to form light road markings. They have sufficient elasticity even at low temperatures (e.g. minus 20°C), as may occur outside in winter. Therefore such road markings do not show, even in the cold, when subjected to the traffic, any embrittlement and cracking resulting in undesirable detaching of individual parts and destruction of the surface. On the other hand, the material also shows dimensional stability with elevated temperatures. Consequently the material is tack-free and flow does not occur.

The preparation of road marking paints is generally performed analogously, wherein the material is subsequently either mixed with a solvent or processed as such. In case the material of the invention is applied to the substrate as coating, only thin layers are applied.

In the following examples the percentages are percentages by weight and the parts are parts by weight. The viscosity refers, unless otherwise indicated, to 50% toluene solutions measured at 20°C. The average molecular weights are calculated average values.

EXAMPLES

1a. Preparation of the resin 1 part of borontrifluoride ethyletherate dissolved in 20 parts of toluene is added dropwise within 1 hour to a solution of 195 parts of styrene, 8 parts of phenol and 1 part of xylenol in 200 parts of toluene. The mixture is simultaneously cooled so that 80°C are not exceeded and subsequently stirred for 3 hours. Water is then added and the catalyst washed out. The polymer is freed from the solvent by distillation and hot poured out. Yield: 198 parts of modified polystyrene (=99%), melting point 60°C, viscosity 15 cP, average molecular weight 3500.

1b. Preparation of the hot melt pouring material 80 parts of a filler composition consisting of 60 parts of titanium dioxide, 250 parts of ground limestone, 290 parts of quartz sand and 200 parts of glass beads are homogeneously mixed at 160°C with 18 parts of the molten resin prepared as under (a) and with 1.2 to 1.8 parts of ethoxylated colophony. The hot melt pouring material thus obtained can be applied in the hot state for road marking.

1c. Preparation of the road marking paint 27 parts of the resin prepared according to (a), 3 parts of ethoxylated colophony and 67 parts of a filler composition consisting of 30 parts of titanium dioxide, 25 parts of ground limestone, 5 parts of talc and 7 parts of asbestos powder are mixed with 40 parts of toluene and 20 parts of acetone at room temperature. A liquid brushable mass is obtained which can also be applied by spraying. At 20 to 50°C this mass may be brushed or sprayed onto the substrate to be marked. If the same amount of gasoline (boiling range from 80° to 110°C), xylene or additional toluene is used instead of acetone, the coating temperature can be increased up to 80°C.

COMPARATIVE TEST V TO EXAMPLE 1

Va. Preparation of the resin

The preparation is performed as described in example (1a) on the basis of the same starting materials and quantities, however no phenol and xylenol are used. Yield: 200 parts of resin (=100%), melting point 75°C, viscosity 30 cP, average molecular weight about 4000.

Vb. Preparation of the hot melt pouring material

Since the phenol-free product is too brittle, it is combined with a higher amount of soft resin in order to achieve a suitable, brushable composition. For this purpose 18 parts of the polystyrene, 4 parts of ethoxylated colophony and 80 parts of the filler composition as used in example (1b) are mixed at 160°C. Due to its too high brittleness this mass is unsuitable for good road markings. If the brittleness is avoided by an increased addition of soft resin, the heat resistance is impaired to such a degree that the mass becomes tacky at temperatures exceeding 30°C.

2a. Preparation of the resin 1920 parts of styrene, 80 parts of phenol and 600 parts of toluene are added within 3 hours to a solution of 20 parts of borontrifluoridephenol in 1000 parts of toluene in a kettle under cooling to 50°C. The mixture is subsequently stirred for 2 hours at the same temperature. 40 parts of calcium hydroxide are then added and after another hour the calcium fluoride and boric acid are filtered. The filtrate is concentrated by evaporation. 1960 parts of resin are obtained (yield 98), melting point 56°C, viscosity 8 cP, average molecular weight 1500.

2b. Preparation of the hot melt pouring material 86 parts of a filler composition consisting of 15 to 20 per cent of glass beads, 6 to 10 per cent of titanium dioxide, 10 to 60 per cent of quartz sand and 10 to 60 per cent of dolomite and 10 to 15 parts of the resin prepared as under (2a) as sole binder are homogeneously mixed according to example (1b), i.e. at 160°C. The composition is suitable as hot melt pouring material.

2c. Preparation of the road marking paint 30 parts of the resin prepared according to (2a) are mixed with 67 parts of the filler composition according to example (1c) and with the same solvents in the same amount and in the same way as mentioned under (1c). A liquid mass is obtained, which analogous to the mass obtained under (1c) is suitable for hot as well as cold coating. The addition of a soft resin is therefore unnecessary, although possible, if desired.

3a. Preparation of the resin

The material is prepared from 700 parts of styrene and 300 parts of phenol in 600 parts of toluene and polymerized according to example (2a). 1990 parts of resin are obtained in form of a liquid product (yield 99.5%), viscosity 2 cP, average molecular weight 400.

3b. Preparation of the hot melt pouring material 4 parts of resin prepared according to (3a) are mixed with 11 parts of a copolymer consisting of 30 parts of styrene, 50 parts of vinyltoluene and 20 parts of indene (melting point 90°C, viscosity 20 cP), and 75 to 90 parts of a filler composition consisting of 15 to 20 per cent glass beads, 6 to 10 per cent titanium dioxide, alkaline, alkaline earth and aluminium silicate and 10 to 60 per cent quartz sand according to example (1b) at 160° to 180°C. The thus prepared hot melt pouring material is suitable for application at elevated temperatures. Equally good products are obtained, if the phenol-free copolymer is modified with 50 per cent of maleic acid diethylester.

4a. Peparation of the resin

As a catalyst 2 parts of borontrifluoride-phenol are added dropwise within 1 hour to a blend of the following hydrocarbon fractions: 20 parts of the boiling range from 20° to 60°C, 100 parts of the boiling range from 136° to 153°C, 40 parts of the boiling range from 165° to 190°C with 6 parts of phenol and 2 parts of cresol. The mixture is cooled so that a temperature of 40°C is not exceeded. It is reacted for a further 3 hours, then water is added and the catalyst is washed out. The polymer is freed from the solvent by distillation and poured out. 110 parts of resin are obtained, (yield 55%), melting point 70°C, viscosity 20 cP, average molecular weight about 2000.

If the resin thus obtained is reacted with 4 per cent of maleic acid diethylester in the melt at 180°C a resin having a melting point of 58°C, a viscosity of 15 cP and the analogous average molecular weight is obtained.

4b. Peparation of the hot melt pouring material 1 part of the resin prepared according to example (4a) is melted at 160° to 180°C and mixed with 6 parts of a filler composition consisting of 15 to 20 per cent of glass beads, 5 to 10 per cent of barium chromate, 10 to 60 per cent of quartz sand and 10 to 60 per cent of dolomite. The resulting hot melt pouring material is then suitable for road markings.

Instead of the resin prepared according to (4a) the resin modified with maleic acid ester — as described above — may be used with equally good results.

5. 1 part of borontrifluoride ethyletherate dissolved in 20 parts of toluene is added dropwise within 1 hour to a solution of 175 parts of styrene, 14 parts of phenol, 1 part of xylenol and 10 parts of isoprene in 200 parts of toluene, the composition is stirred for 3 hours without exceeding 30°C. Subsequently water is added and the catalyst washed out. The solvent is released by distillation at 150°C and 3 parts of maleic acid dibutylester are added to the polymer within 2 hours at 200°C. Yield: 200 parts, melting point 62°C, viscosity 12 cP, average molecular weight 3,750.

The hot melt pouring material and the road marking paint are prepared as described in example 1. The tests have proved in every respect the high quality properties of the material.

6. The starting material consisting of 1,500 parts of styrene and 500 parts of phenol in 1,000 parts of toluene is polymerized according to example 2a). 1,950 parts of resin having a molecular weight of about 400 in the form of a liquid product are obtained. 25 parts of this resin are melted together with 75 parts of a resin prepared according to the comparative test Va. Hot melt pouring material is prepared as described in example (1b) from 18 parts of this composition, however without the addition of ethoxylated colophony. The product meets the given requirements.

7. The resin described in example (2a) is stirred in the melt with a conventional plasticizer based on adipic acid butanediol-1,4 polyester or ethoxylated colophony. Analogous to example (2b) the hot melt pouring material is prepared. The product corresponds in every respect to the requirements.

8. 80 parts of the resin according to example 1a) are melted together with 20 parts of the resin prepared under (2a) (melting point 58°C, viscosity about 10 cP). The composition is processed in accordance with example (2b). The composition is suitable for hot melt pouring material.

TEST OF THE MATERIAL

The material prepared according to the invention has been tested as to its form, light stability and flow, e.g. on the basis of the falling ball test and by ultraviolet radiation.

For the falling ball test balls of a diameter of 4 cm are prepared from the hot material which are cooled down to minus 20°C for 24 hours. Then they are dropped on a stone floor from a height of 2 m. If the material has a sufficient resistance to mechanical stress in the cold, the balls must not burst.

In order to determine the flow properties the hot melt pouring material is applied to a metal sheet provided with holes (440 holes/square meter, diameter 1 cm each) at a coat thickness of 0.5 cm and heated for 8 hours at 100°C. The material must not flow through the holes.

To determine the light stability the hot melt pouring material is applied to an asbestos plate of about 50 square centimeter at a coat thickness of about 5 mm, half of this coating is then covered with an aluminium foil. The coated surface is exposed to a radiation system consisting of an ultraviolet lamp and 4 high pressure mercury vapor lamps. After radiation of about 40 hours the non-covered part of the material should not be discoloured nor have become tacky. Good light stability is shown if the material is still pure white after exposure to radiation and is not tacky after cooling.

Testing results

| Example: | 1 | 2 | 3 | 4 | V |
|---|---|---|---|---|---|
| Falling ball test | good | good | good | good | bad |
| Flow properties | good | good | good | good | bad |
| Light stability | good | good | good | good | good |

As evident from the table, the products in accordance with the invention are characterized by good elasticity which is also maintained in the cold. Under these conditions the unmodified resins, however, become brittle and hair-cracking occurs. The balls from the comparative samples burst under the present test conditions.

Additions of plasticizers may slightly reduce the formation of haircracking, but will not eliminate it completely. On the other hand, the flow is impaired to such an extent that the colour is unsuitable. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. In a resinous road-marking composition consisting essentially of pigment, filler and binder, the improvement wherein the binder comprises hydrocarbon resin which:
   a. has an average molecular weight of up to 10,000,
   b. is based on at least one olefinically-unsaturated monomer having a boiling point within the range from 130° to 200°C, and
   c. contains from 4 to 50 percent by weight of chemically built-in phenolic components, and the weight ratio of binder to the total of filler and pigment is within the range of from 1:3 to 1:10.

2. A composition according to claim 1 wherein the binder further comprises up to a five-fold quantity of hydrocarbon resin which is free from phenolic components.

3. A composition according to claim 2 wherein a) an essential amount of at least one hydrocarbon resin consists of styrene units and b) the weight ratio of the phenol-free hydrocarbon resin to the phenol-containing hydrocarbon resin is up to 5:1.

4. A composition according to claim 2 characterized by binder wherein the phenolic-conponent-containing resin contains at least 10 percent by weight of phenolic components, the phenol-free hydrocarbon resin is high-molecular-weight resin, and the phenolic-component-containing and phenol-free hydrocarbon resins are in admixture with each other.

5. A composition according to claim 1 wherein the binder comprises at least one resin based on polystyrene.

6. A composition according to claim 1 characterized by an average molecular weight of at least 300 for the phenolic-component-containing hydrocarbon resin.

7. A composition according to claim 1 characterized by binder containing at least one member selected from the group consisting of a) monomer which acts as a chain-stopping agent, b) chemically built-in maleic acid and c) a derivative of (b).

8. A composition according to claim 1 characterized by binder comprising hydrocarbon resin, with from 4 to 15 percent by weight of phenolic components, in admixture with plasticized selected from the group consisting of saturated polyester, polyurethane, chlorinated paraffin and oxethylated colophony.

9. A composition according to claim 1 which is a liquid coating composition in solution or melt form.

10. A composition as claimed in claim 1 wherein the binder comprises resin based on at least one olefinically-unsaturated hydrocarbon monomer selected from the group consisting of
   a. those having a boiling point within the range of from 130° to 200° C, and
   b. monomer having a boiling point within the range of from 130° to 200° C in admixture with aliphatic or alicyclic monomer having a boiling point within the range of from minus 20° to plus 60°C.

11. A composition according to claim 1 wherein resin in the binder consists essentially of a member selected from the group consisting of a) the hydrocarbon resin which has an average molecular weight of up to 10,000 and contains from 4 to 50 percent by weight of chemically built-in phenolic components and b) phenolic-component-free hydrocarbon resin in combination with (a).

12. A process for preparing a hot-melt-pourable composition according to claim 1 which consists essentially of maintaining the hydrocarbon resin binder molten at a temperature ranging from 100° to 200 C while homogeneously admixing the pigment and the filler therewith.

13. A process according to claim 12 which further comprises a) concurrent monomer polymerization and reaction with at least one phenol in a single step and in contact with a catalyst and b) subsequent removal of the catalyst to produce the phenolic-component-containing hydrocarbon resin; the monomer being aromatic monomer having a boiling point ranging from 130° to 200° C or a combination of such aromatic monomer with aliphatic monomer having a boiling point ranging from minus 20° to plus 60° C, and the phenol a) being mono- to polynuclear, b) being mono- to polyhydric and c) having free phenolic hydroxyl, at least partially etherified phenolic hydroxyl or at least partially esterified phenolic hydroxyl.

14. A composition according to claim 10 wherein monomer having a boiling point within the range of from 130° to 200° C is dicyclopentadiene, dihydrodicyclopentadiene or aromatic monomer.

15. A composition according to claim 14 wherein the aromatic monomer is a member selected from the group consisting of styrene, allylbenzene, α-methylstyrene, a vinyltoluene, β-methylstyrene, indene and methylindene.

16. A composition according to claim 10 wherein the aliphatic monomer is a member selected from the group consisting of butadiene, isoprene, piperylene, isoamylene, n-pentene, isopentene and dimethylbutadiene, and the alicyclic monomer is a member selected from the group consisting of cyclopentene and cyclopentadiene.

17. A composition according to claim 10 wherein the olefinically-unsaturated hydrocarbon monomer is aromatic monomer having a boiling point within the range of from 130° to 200° C.

18. A composition according to claim 10 wherein the hydrocarbon monomer is a combination of olefinically-unsaturated aromatic monomer having a boiling point within the range of from 130° to 200° C and olefinically-unsaturated aliphatic or alicyclic monomer having a boiling point within the range of from minus 20° to plus 60° C.

19. A composition according to claim 18 wherein the monomer having a boiling point within the range of from minus 20° to plus 60° C is alicyclic monomer selected from the group consisting of cyclopentene and cyclopentadiene.

20. A composition according to claim 18 wherein the monomer having a boiling point within the range of from minus 20° to plus 60° C is a member selected from the group consisting of isoamylene, n-pentene and isopentene.

21. A composition according to claim 10 wherein the olefinically-unsaturated hydrocarbon monomer is monomer having a boiling point within the range of from 130° to 200° C and selected from the group consisting of dicyclopentadiene and dihydrodicyclopentadiene.

22. A composition according to claim 10 wherein the pigment, filler and binder and the respective proportions thereof are suitable for a road-marking composition, and the binder is based on at least one olefinically-unsaturated monomer selected from the group consisting of:
1. aromatic monomer having a boiling point within the range of from 130° to 200° C,
2. aromatic monomer (1) in admixture with monomer having a boiling point within the range of from minus 20° to plus 60° C and selected from the group consisting of monoolefinically-unsaturated aliphatic monomer, cyclopentene and cyclopentadiene and
3. dicyclopentadiene or dihydrodicyclopentadiene.

23. A method of applying a marking to a surface destined to bear vehicular traffic which comprises applying to said surface a composition as claimed in claim 1 as a hot melt.

* * * * *

UNITED STATES PATENT AND TRADEMARK OFFICE
CERTIFICATE OF CORRECTION

PATENT NO. : 3,958,041
DATED : May 18, 1976
INVENTOR(S) : WAGNER ET AL

It is certified that error appears in the above-identified patent and that said Letters Patent are hereby corrected as shown below:

Column 2, line 26, "stright" should read --straight--. Column 3, line 16, "to" should read --a--; line 17, "lower" should read --low--; line 36, "terophthalic" should read --terephthalic--. Column 4, lines 27 and 61, "cP" should read --cp--. Column 5, line 11, "borontrifluoridephenol" should read --borontrifluoride-phenol--; line 17, "98" should read --98%--; lines 18, 46, and 52, "cP" should read --cp--. Column 6, lines 7, 11, 35 and 59, "cP" should read --cp--; line 42, "2a)" should read --(2a)--; line 46, "Va" should read --(Va)--; line 57, "1a)" should read --(1a)--. Column 7, line 15, "mm," should read --mm;--; lines 60 to 62, "and the ... 1:10." should be separated from the text of (c) and should be flush with the left margin. Column 8, line 5, "conponent" should read --component--; line 25, "plasticized" should read --plasticizer--; line 52, "200" should read --200°--. Column 10, line 23, "plug" should read --plus--.

Signed and Sealed this

Thirteenth Day of June 1978

[SEAL]

Attest:

RUTH C. MASON
Attesting Officer

DONALD W. BANNER
Commissioner of Patents and Trademarks